(12) United States Patent
Iinuma

(10) Patent No.: US 7,110,480 B1
(45) Date of Patent: Sep. 19, 2006

(54) ADAPTIVE ARRAY APPARATUS

(75) Inventor: Toshinori Iinuma, Gihu (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/958,235

(22) PCT Filed: Apr. 6, 1999

(86) PCT No.: PCT/JP99/01828

§ 371 (c)(1),
(2), (4) Date: Oct. 5, 2001

(87) PCT Pub. No.: WO00/60764

PCT Pub. Date: Oct. 12, 2000

(51) Int. Cl.
*H04B 7/10* (2006.01)
*H04L 1/02* (2006.01)

(52) U.S. Cl. ............ 375/347; 375/299; 375/267; 455/132; 455/101

(58) Field of Classification Search ........ 375/144, 375/267, 299, 347; 455/101, 278.1, 562.1, 455/575.7
See application file for complete search history.

(56) References Cited

U.S. PATENT DOCUMENTS

| | | | |
|---|---|---|---|
| 4,736,460 A * | 4/1988 | Rilling | 455/283 |
| 5,191,546 A | 3/1993 | Green | 708/290 |
| 5,694,416 A * | 12/1997 | Johnson | 375/148 |
| 5,966,095 A * | 10/1999 | Hiramatsu et al. | 342/383 |
| 6,087,986 A * | 7/2000 | Shoki et al. | 342/383 |
| 6,141,393 A * | 10/2000 | Thomas et al. | 375/347 |
| 6,636,729 B1 * | 10/2003 | Hiramatsu et al. | 455/278.1 |
| 6,708,020 B1 * | 3/2004 | Hiramatsu et al. | 455/65 |
| 6,721,367 B1 * | 4/2004 | Miya et al. | 375/267 |

OTHER PUBLICATIONS

R.J. Kozick; F.J. Elmer; V. Nalbandian—"Phased Arrays Composed of Antennas with Steerable Patterns" Radar Coference 1995, Record of the IEEE 1995 Intl, May 8-11, 1995, pp. 737-741.
C.T. Chiang; Y.H. Chin—"A Modified Adaptive Antenna Array Using Analytic Signal Processing" Antennas and Propagation Society Intl Symposium, vol. 1, Jun. 21-26, 1998, pp. 211-214.

* cited by examiner

*Primary Examiner*—Temesghen Ghebretinsae
*Assistant Examiner*—Juan Alberto Torres

(57) ABSTRACT

The control unit 50 calculates weighting factors for one symbol out of every k symbols. During this calculation, the control unit 50 calculates weighting factors for respective inphase and quadrature components of the symbol stored in every I and Q buffers based on the inphase and quadrature components. The control unit 50 also interpolates weighting factors for the remaining k-1 symbols. During this interpolation, the control unit 50 uses the weighting factors that are currently calculated and the weighting factors that have been previously calculated and are stored in the W buffer 51. The calculated and interpolated weighting factors are used for forming a directivity pattern.

12 Claims, 11 Drawing Sheets

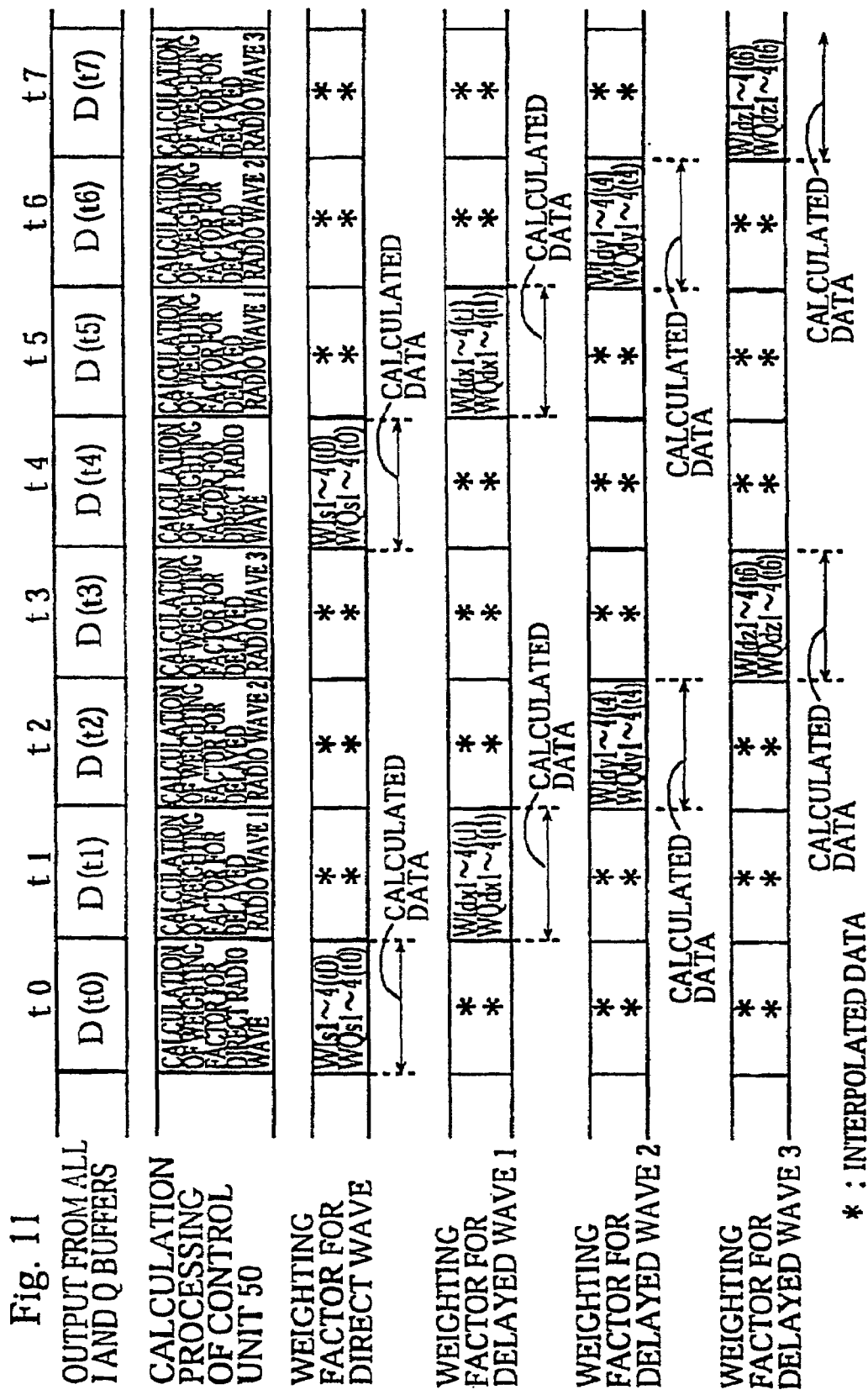

Fig. 12

| OUTPUT FROM ALL I AND Q BUFFERS | t0 | t1 | t2 | t3 | t4 | t5 | t6 | t7 |
|---|---|---|---|---|---|---|---|---|
| | D(t0) | D(t1) | D(t2) | D(t3) | D(t4) | D(t5) | D(t6) | D(t7) |

| CALCULATION PROCESSING OF CONTROL UNIT 50 | TIME SLOT 1 | TIME SLOT 2 | TIME SLOT 3 | TIME SLOT 4 | TIME SLOT 1 | TIME SLOT 2 | TIME SLOT 3 | TIME SLOT 4 |
|---|---|---|---|---|---|---|---|---|

| No | SITUATION | PROCESSING IN TIME SLOT 1 | PROCESSING IN TIME SLOT 2 | PROCESSING IN TIME SLOT 3 | PROCESSING IN TIME SLOT 4 |
|---|---|---|---|---|---|
| 1 | FOR FOUR USER | USER 1 | USER 2 | USER 3 | USER 4 |
| 2 | FOR ONE USER | DIRECT WAVE | DELAYED WAVE 1 | DELAYED WAVE 2 | DELAYED WAVE 3 |
| 3 | FOR ONE USER (DIRECT WAVE + DELAYED WAVE 1) | DIRECT WAVE | DELAYED WAVE 1 | DIRECT WAVE | DELAYED WAVE 1 |
| 4 | FOR ONE USER (DIRECT WAVE, PAUSE) | DIRECT WAVE | PAUSE | DIRECT WAVE | PAUSE |
| 5 | FOR ONE USER (DIRECT WAVE + DELAYED WAVE 1, PAUSE) | DIRECT WAVE | PAUSE | DELAYED WAVE 1 | PAUSE |
| 6 | FOR TWO USER (DIRECT WAVE) | DIRECT WAVE OF USER 1 | DIRECT WAVE OF USER 2 | DIRECT WAVE OF USER 1 | DIRECT WAVE OF USER 2 |
| 7 | FOR TWO USER (DIRECT WAVE + DELAYED WAVE) | DIRECT WAVE OF USER 1 | DELAYED WAVE OF USER 1 | DIRECT WAVE OF USER 2 | DELAYED WAVE OF USER 2 |
| 8 | FOR TWO USER (DIRECT WAVE + DELAYED WAVE, PAUSE) | DIRECT WAVE OF USER 1 | DELAYED WAVE OF USER 1 | DIRECT WAVE OF USER 2 | PAUSE |
| 9 | FOR THREE USER (DIRECT WAVE + DELAYED WAVE 1) | DIRECT WAVE OF USER 1 | DELAYED WAVE OF USER 1 | DIRECT WAVE OF USER 2 | DIRECT WAVE OF USER 3 |
| 10 | FOR THREE USER (DIRECT WAVE, PAUSE) | DIRECT WAVE OF USER 1 | DIRECT WAVE OF USER 2 | DIRECT WAVE OF USER 3 | PAUSE |

ADAPTIVE ARRAY APPARATUS

FIELD OF THE INVENTION

The present invention relates to an adaptive array apparatus that adaptively generates directivity patterns using a plurality of antennas, and in particular to a technique for improving the efficiency of signal processing for generating directivity patterns.

BACKGROUND OF THE INVENTION

In recent years, to raise transfer efficiency, digital communication devices transfer information by modulating a carrier wave using a digital information signal (baseband signal).

In digital communication, frequencies can be efficiently used by raising the transfer speed and utilizing each single frequency band for multiple channels corresponding to multiple users.

The significant upsurge in the number of users of mobile communication services causes the shortage of frequency bands. The adaptive array method receives attention as a countermeasure against this problem.

The adaptive array method adaptively generates a directivity pattern using a plurality of antennas so that an adaptive array apparatus transmits radio waves only to a specific user during transmission and receives radio waves only from a specific user during reception. Take, for example, an adaptive array apparatus that has four communication subsystems that each include a transmission circuit, a reception circuit, and an antenna. The adaptive array apparatus respectively generates directivity patterns for transmission and reception by adjusting the amplitude and phase of the transmission signal in each communication subsystem during transmission and by adjusting the amplitude and phase of the reception signal in each communication subsystem during reception. The adaptive array method is described in *Adaptive Signal Processing for Spatial Regions and Its Technical Applications* (in "Transactions of the Institute of Electronics and Communication Engineers of Japan", Vol. J75-B-II No. 11, November 1992) and so is not described in detail here. A Modified Adaptive Antenna Array Using Analytic Signal Processing (C. T. CHIANG; Y. H. CHEN, ANTENNAS AND PROPAGATION SOCIETY INTL SYMPOSIUM) discloses an adaptive array calculation technique in which desired signals are extracted by multiplying each input signal received via one of a plurality of antennas by a weighting factor.

A path division multiple access (PDMA) communication method is proposed which allows a plurality of users to simultaneously use the same frequency according to the adaptive array method. With the PDMA communication method, radio waves are transmitted and received using a plurality of directivity patterns which are each generated for one radio set (user). The PDMA communication method is described in *Path Division Multiple Access (PDMA) Mobile Communication Method* (in "Shingakugihou", RSC93-84 (1994-01), Institute of Electronics and Communication Engineers of Japan) and so is not described in detail here.

When the adaptive array method is applied to a mobile communication, a directivity pattern needs to be adjusted according to the change in a propagation circumstance. This is because the location of a user changes and the propagation circumstance changes with time. When analog processing that uses a conventional phase unit is applied to such a mobile communication, various problems are created concerning the precision, stability, and trackability of the mobile communication. Therefore, it is realistic that the adaptive array method is realized using digital signal processing.

The amplitude and phase of the signal dealt with in each communication subsystem are adjusted using the digital signal processing, as described above. In the case of a digital quadrature phase modulation, for instance, appropriate weights are assigned to the inphase component and the quadrature component of each symbol dealt with in each communication subsystem. The inphase component and quadrature component of each symbol are hereinafter simply referred to as an I component and a Q component, respectively. By doing so, the amplitude and phase of each symbol are adjusted. Accordingly, the signal processing is mainly composed of calculating the weighting factors corresponding to the I and Q components dealt with in each communication subsystem.

To adjust a directivity pattern according to the change in a propagation circumstance, the time interval for the adjustment needs to be shorter than the time taken by the propagation circumstance to change. Therefore, for instance, it is preferable that the directivity pattern is adjusted in each symbol period. Also, the transfer speed of data in a recent mobile communication system becomes faster and the symbol period is shortened. In the PHS (personal handyphone system), for instance, the symbol period has been shortened to about five microseconds. Consequently, directivity patterns need to be adjusted in a short time.

The amount of signal processing necessary for the adaptive array method is significantly great because matrix calculations need to be performed to calculate the weighting factors described above. This causes a problem of how to perform a large amount of signal processing for the adaptive array method.

This problem becomes more pronounced when a plurality of users simultaneously use the same frequency according to the PDMA communication method to efficiently use frequencies. That is, the amount of signal processing increases in proportion to the number of users due to the signal processing needs to be performed for each user.

It is difficult for one DSP (digital signal processor) to simultaneously process signals for a plurality of users due to the limitation of its signal processing capacity. To cope with this problem, a plurality of DSPs may be used to perform signal processing necessary for the adjustment for a plurality of users in parallel. However, this inevitably increases the hardware scale and cost of an adaptive array apparatus.

In view of the stated problems, the present invention provides an adaptive array apparatus which reduces the amount of signal processing necessary for the adjustment of a directivity pattern and minimizes the increase in the hardware scale and cost.

More specifically, the present invention provides an adaptive array apparatus which appropriately performs the signal processing necessary for the adjustment for each user even if the number of users increases.

SUMMARY OF THE INVENTION

The object of the present invention can be achieved by An adaptive array apparatus comprising a plurality of antennas (17, 27, 37, 47) and a weighting unit (50) that outputs a string of desired signals by multiplying reception signals, which are respectively received via the plurality of antennas at each reception timing, by weighting factors and totaling multiplication results obtained at the reception timing, the adaptive array apparatus being characterized in that the weighting unit includes: a first calculation unit (steps 71 and 73) that calculates actual weighting factors from reception signals received at certain reception timings, the actual weighting factors corresponding to some desired signals in the string; and a second calculation unit (steps 75 and 76) that calculates estimated weighting factors from the actual weighting factors, the estimated weighting factors corresponding to each desired signal other than the some desired signals.

Here, the actual weighting factors calculated by the first calculation unit may correspond to two discontinuous desired signals, and the estimated weighting factors may be calculated by the second calculation unit from the actual weighting factors corresponding to at least one of the two discontinuous desired signals.

Here, the second calculation unit may calculate the estimated weighting factors by linearly interpolating the actual weighting factors corresponding to both of the two discontinuous desired signals.

Here, the second calculation unit may calculate the estimated weighting factors from the actual weighting factors corresponding to preceding one of the two discontinuous desired signals.

Here, the second calculation unit may calculate the estimated weighting factors from the actual weighting factors corresponding to succeeding one of the two discontinuous desired signals.

Here, a string of first desired signals and a string of second desired signals may be obtained from the reception signals received at each reception timing, the first calculation unit may calculate first actual weighting factors and second actual weighting factors from the reception signals received at the certain reception timings, each reception timing at which the first actual weighting factors are calculated differing from each reception timing at which the second actual weighting factors are calculated, the first actual weighting factors corresponding to some of the first desired signals, and the second actual weighting factors corresponding to some of the second desired signals, and the second calculation unit may calculate first estimated weighting factors from the first actual weighting factors and calculates second estimated weighting factors from the second actual weighting factors, the first estimated weighting factors corresponding to each first desired signal other than the some first desired signals, and the second estimated weighting factors corresponding to each second desired signal other than the some second desired signals.

Here, each of the first and second desired signals may include an inphase component and a quadrature component, and the first calculation unit may calculate the first actual weighting factors corresponding to each inphase component and each quadrature component in the some first desired signals, and calculate the second actual weighting factors corresponding to each inphase component and each quadrature component in the some second desired signals.

Here, the first and second desired signals may respectively correspond to a direct wave and an indirect wave of a radiowave that is transmitted from a device and is received via the plurality of antennas.

Here, the first and second calculation units may be achieved by a programmable digital signal processor.

Here, each reception signal may include at least two types of desired signals, the first calculation unit may calculate actual weighting factors corresponding to each type of desired signal at a different reception timing; and the second calculation unit may calculate estimated weighting factors corresponding to each type of desired signal.

The present invention can be achieved by an adaptive array apparatus, including a plurality of pairs of an antenna and a radio unit, for transmitting and receiving symbols using the radio units in each symbol period using combining coefficients, the combining coefficients being calculated for each radio unit and being used for forming a directivity pattern, the adaptive array apparatus including: a storing unit for storing symbols that are received by every radio unit in a plurality of symbol periods, each radio unit receiving a symbol in each symbol period; a calculation unit for calculating combining coefficients corresponding to a given symbol period out of the plurality of symbol periods, based on symbols corresponding to the given symbol period out of the stored symbols; and an interpolation unit for interpolating combining coefficients corresponding to symbol periods other than the given symbol period out of the plurality of symbol periods, based on the calculated combining coefficients.

With this construction, the calculation unit calculates combining coefficients for one symbol period out of every group of a plurality of symbol periods and the interpolation unit interpolates combining coefficients for the remaining symbol periods. Therefore, the amount of signal processing necessary to calculate combining coefficients is reduced. This enables a DSP of poor throughput to perform the necessary signal processing. As a result, the increase in the hardware scale and cost of an adaptive array apparatus is minimized.

Here, the storing unit may store symbols that are received in the latest k symbol periods (k is no less than two), the calculation unit may calculate combining coefficients corresponding to a given symbol period out of every group of k symbol periods, there being k-1 symbol periods between the given symbol period and a previous given symbol period for which the calculation unit calculates combining coefficients, and the interpolation unit may interpolate combining coefficients corresponding to the k-1 symbol periods between the given symbol period and the previous given symbol period, based on the combining coefficients calculated for the given symbol period and the previous given symbol period.

Here, the interpolation unit may linearly interpolate the combining coefficients corresponding to the k-1 symbol periods based on the combining coefficients calculated for the given symbol period and the previous given symbol period.

With this construction, the interpolation unit linearly interpolates the combining coefficients corresponding to the k-1 symbol periods based on the combining coefficients calculated for the given symbol period and the previous given symbol period. Therefore, combining coefficients are interpolated for each symbol period of the k-1 symbol periods. As a result, a directivity pattern is adjusted according to the change in a propagation circumstance.

Here, the interpolation unit may use the combining coefficients corresponding to the previous given symbol period as the interpolated combining coefficients.

With this construction, the interpolation unit does not need to calculate combining coefficients for each symbol periods of the k-1 symbol periods. As a result, the amount of signal processing performed by the interpolation unit is reduced.

Here, the interpolation unit may use the combining coefficients corresponding to the given symbol period as the interpolated combining coefficients.

With this construction, the interpolation unit does not need to calculate combining coefficients for each symbol periods of the k-1 symbol periods. As a result, the amount of signal processing performed by the interpolation unit is reduced.

Here, the calculation unit may calculate combining coefficients used for forming a directivity pattern for one user radio in the given symbol period and calculate combining coefficients used for forming a directivity pattern for another user radio in a different given symbol period out of every group of k symbol periods, there being k-1 symbol periods between the different given symbol period and a previous different given symbol period for which the calculation unit calculates combining coefficients used for forming the directivity pattern for the other user radio, and the interpolation unit may interpolate combining coefficients corresponding to the k-1 symbol periods between the given symbol period and the previous given symbol period, based on the combining coefficients calculated in the given symbol period and the previous given symbol period, and interpolate combining coefficients corresponding to the k-1 symbol periods between the different given symbol period and the previous different given symbol period, based on the combining coefficients calculated in the different given symbol period and the previous different given symbol period.

With this construction, the calculation unit calculates combining coefficients for respective user radios and the interpolation unit interpolates combining coefficients for respective user radios. Therefore, directivity patterns are simultaneously formed for respective user radios without increasing the amount of signal processing. The calculation unit calculates combining coefficients used for forming the directivity patterns for respective user radios in different symbol periods. As a result, the adaptive array apparatus of the present invention can be constructed with one DSP.

Here, each symbol may be expressed by an inphase component and a quadrature component, the storing unit may store inphase components and quadrature components of the symbols received in the latest k symbol periods, the calculation unit may calculate combining coefficients corresponding to inphase components and quadrature components of the symbols corresponding to the given symbol period out of the stored symbols, based on the inphase components and the quadrature components of the corresponding symbols, and the interpolation unit may interpolate combining coefficients corresponding to the k-1 symbol periods between the given symbol period and the different given symbol period, based on the combining coefficients calculated in the given symbol period and the different given symbol period.

Here, the calculation unit may calculate combining coefficients used for forming a directivity pattern for a direct wave in the given symbol period and calculates combining coefficients used for forming a directivity pattern for an indirect wave in a different given symbol period out of every group of k symbol periods, there being k-1 symbol periods between the different given symbol period and a previous different given symbol period for which the calculation unit calculated combining coefficients used for forming the directivity pattern for the indirect wave, and the interpolation unit may interpolate the combining coefficients corresponding to the k-1 symbol periods between the given symbol period and the different given symbol period, based on the combining coefficients calculated in the given symbol period and the previous given symbol period, and interpolates combining coefficients corresponding to k-1 symbol periods between the different given symbol period and the previous different given symbol period, based on the combining coefficients calculated in the different given symbol period and the previous different given symbol period. With this construction, the path diversity is realized without difficulty.

Here, the calculation unit and the interpolation unit may include a programmable digital signal processor. As a result, the increase in the hardware scale and cost of an adaptive array apparatus is minimized.

The stated object of the present invention can also be achieved by an adaptive array apparatus, including a plurality of pairs of an antenna and a radio unit, for transmitting and receiving symbols using the radio units in each symbol period using combining coefficients, the combining coefficients being calculated for each radio unit and being used for forming directivity patterns which each correspond to one of a plurality of user radios, the adaptive array apparatus including: a storing unit for storing symbols that are received by every radio unit in the latest k symbol periods (k is no less than three), each radio unit receiving a symbol in each symbol period; a calculation unit for calculating combining coefficients corresponding to a given symbol period out of every group of k symbol periods, based on symbols corresponding to the given symbol period out of the stored symbols, there being k-1 symbol periods between the given symbol period and a previous given symbol period for which the calculation unit calculated combining coefficients; and an interpolation unit for interpolating combining coefficients corresponding to the k-1 symbol periods between the given symbol period and the previous given symbol period, based on the calculated combining coefficients corresponding to the given symbol period and the previous given symbol period.

Here, the variable k may be no less than a number of symbol periods that equates to the time taken by the calculation unit to calculate combining coefficients for all of the plurality of user radios.

With this construction, the calculation unit does not need to simultaneously use a plurality of DSPs. Therefore, the calculation unit calculates combining coefficients for a plurality of radio units with one DSP. Also, even if a DSP of a poor throughput is used, combining coefficients are calculated for a plurality of user radios by setting the variable k based on the throughput of the DSP.

BRIEF DESCRIPTION OF THE DRAWINGS

FIG. 11 is the timing chart of the calculation processing of the control unit 50 of Embodiment 3; and FIG. 12 shows modifications of the adaptive array apparatuses of the present invention.

DESCRIPTION OF THE PREFERRED EMBODIMENTS

Embodiment 1

<Simplified Construction of Adaptive Array Apparatus>

Figure 1:
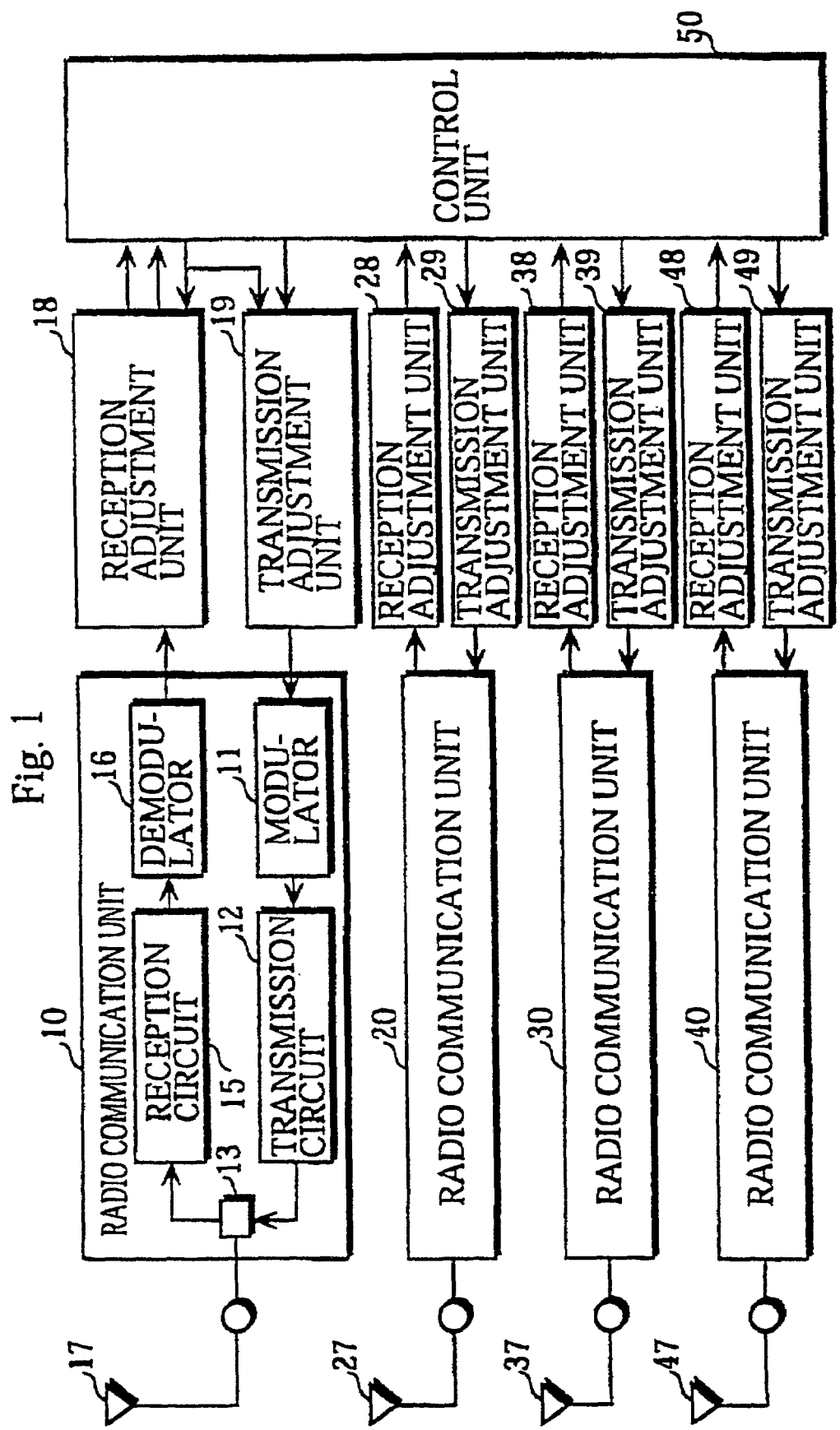
FIG. 1 is a block diagram showing the construction of the adaptive array apparatus of Embodiment 1 of the present invention.

FIG. 1 is a block diagram showing the construction of the adaptive array apparatus of Embodiment 1 of the present invention. The adaptive array apparatus of the present embodiment includes radio communication units 10, 20, 30, and 40, antennas 17, 27, 37, and 47, reception adjustment units 18, 28, 38, and 48, transmission adjustment units 19, 29, 39, and 49, and a control unit 50. This adaptive array apparatus is provided as a base station for mobile communication using devices such as digital portable telephones. The radio communication unit 10 includes a modulator 11, a transmission circuit 12, a switch 13, a reception circuit 15, and a demodulator 16.

In the radio communication unit 10, the modulator 11 modulates a baseband signal that is input from the control unit 50 via the transmission adjustment unit 19 to convert it into an intermediate frequency signal (hereinafter abbreviated to "IF signal"). The transmission circuit 12 converts the IF signal received from the modulator 11 into a high-frequency signal (hereinafter abbreviated to "RF signal"), and amplifies the RF signal to the transmission output level. The switch 13 switches between transmission and reception. The reception circuit 15 converts a reception signal into an IF signal. The demodulator 16 demodulates the IF signal that is input from the reception circuit 15 to convert it into the baseband signal. Here, the modulator 11 and the demodulator 16 may use any type of digital modulation and demodulation method, such as $\pi/4$ shift QPSK (Quadrature Phase Shift Keying). In the present embodiment, the baseband signal that has been generated by the demodulator 16 is time series data represented by an I component and a Q component of each symbol.

The reception adjustment unit 18 adjusts the amplitude and phase of reception baseband signal that is input from the demodulator 16 according to the instructions from the control unit 50. More specifically, when an I component and a Q component of a reception baseband signal are input for one symbol from the demodulator 16, the reception adjustment unit 18 adjusts the amplitude and phase of the symbol by respectively assigning weights to the I component and the Q component.

Figure 2:
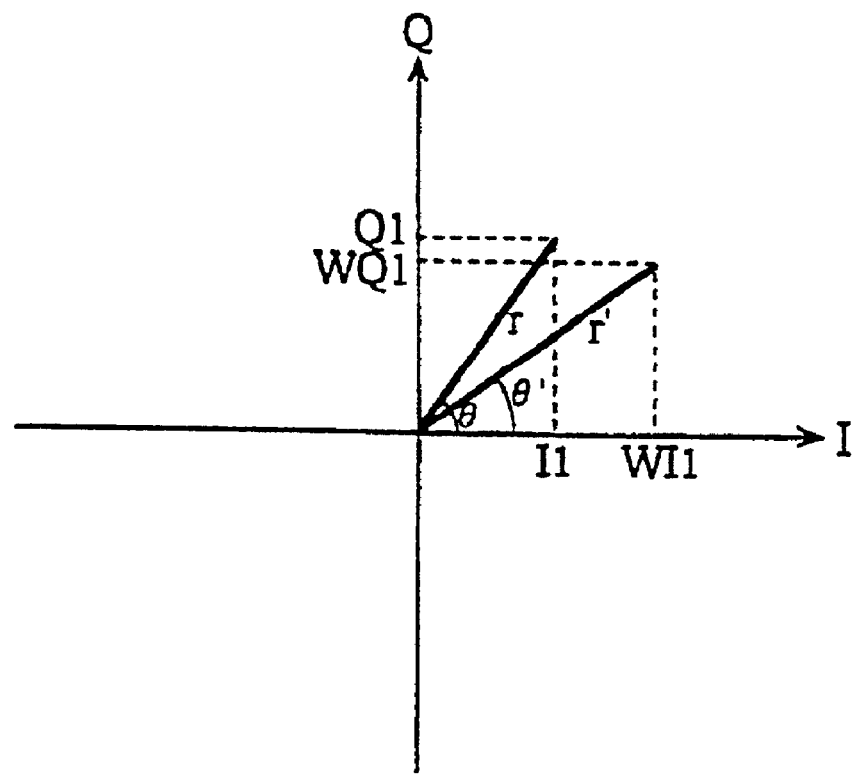
FIG. 2 shows a state where a symbol is adjusted by assigning weights to the symbol.

FIG. 2 shows a state where a symbol is adjusted by assigning weights to the symbol. In this drawing, a symbol that has been generated by the demodulator 16 and a symbol to which weights have been assigned are shown on an I-Q coordinate plane. I1 and Q1 respectively represent the I and Q components of the symbol generated by the demodulator 16. WI1 and WQ1 respectively represent the I and Q components of the symbol to which weights have been assigned by the reception adjustment unit 18. As shown in this drawing, the reception adjustment unit 18 adjusts the amplitude and phase of each symbol by respectively assigning weights to the I component and the Q component of each symbol. The control unit 50 determines the weighting factors used to respectively assign weights to the I component and the Q component.

The transmission adjustment unit 19 adjusts the amplitude and the phase of a transmission baseband signal input from the control unit 50 to generate a directivity pattern. This adjustment is performed in the same way as shown in FIG. 2.

The radio communication units 20, 30, and 40 all have the same construction as the radio communication unit 10 and so will not be described here.

Figure 3:
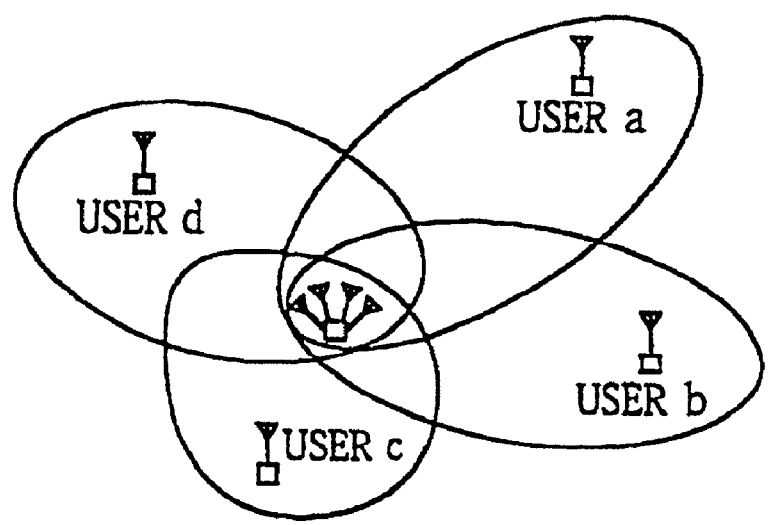
FIG. 3 shows a state where a plurality of directivity patterns are generated to allow a plurality of users to simultaneously use the same frequency.

The control unit 50 includes a programmable digital signal processor as its main element and realizes the following functions by executing a program. That is, the control unit 50 controls the transmission and reception operations of the radio communication units 10–40. The control unit 50 also calculates weighting factors corresponding to the I and Q components of each symbol dealt with in each radio communication unit and outputs the calculated weighting factors to the reception adjustment unit 18 and the transmission adjustment unit 19 to generate a plurality of directivity patterns. The plurality of directivity patterns are each a directivity pattern that is generated for one user in the case where a plurality of users simultaneously use the same frequency. FIG. 3 shows a state where a plurality of directivity patterns are generated. In this drawing, four user radio sets "a"–"d" (hereinafter abbreviated to users "a"–"d") simultaneously use the same frequency.

As described above, in each symbol period, the control unit 50 calculates weighting factors corresponding to the I and Q components of the symbol dealt with in each radio communication unit for one user. In the present embodiment, the processing amount of the control unit 50 is reduced to increase the efficiency of the control unit 50. That is, when four users simultaneously use an adaptive array apparatus as shown in FIG. 3, the control unit 50 allocates one symbol period out of every four symbol periods to the user "a" as a period for processing signals for the user "a". In the allocated symbol period, for the user "a", the control unit 50 calculates weighting factors for the allocated symbol period based on the symbol received in the allocated symbol period, and interpolates weighting factors for three other symbol periods based on calculated weighting factors. The calculation of weighting factors based on received symbols and the interpolation of weighting factors based on calculated weighting factors are hereinafter referred to as direct calculation processing and indirect calculation processing, respectively. If weighting factors are calculated for each user in each symbol period by the direct calculation processing, the control unit 50 needs to perform an enormous amount of processing. Therefore, in the present embodiment, the processing amount of the control unit 50 is reduced to increase the efficiency of the control unit 50.

Similarly, the control unit 50 allocates another symbol period out of every four symbol periods to the user "b" and calculates weighting factors for the user "b" by the direct calculation processing and the indirect calculation processing. The remaining two symbol periods out of every four symbol periods are respectively allocated to the users "c" and "d" and the same operation is performed.

As described above, the control unit 50 needs to calculate weighting factors for each user. This is because each of the users "a"–"d" requires a unique directivity pattern, as shown in FIG. 3. To efficiently perform the signal processing concerning weighting factors which represent unique directivity patterns, the control unit 50 cyclically allocates symbol periods to each user.

<Construction of Main Part of Adaptive Array Apparatus>

Figure 4:
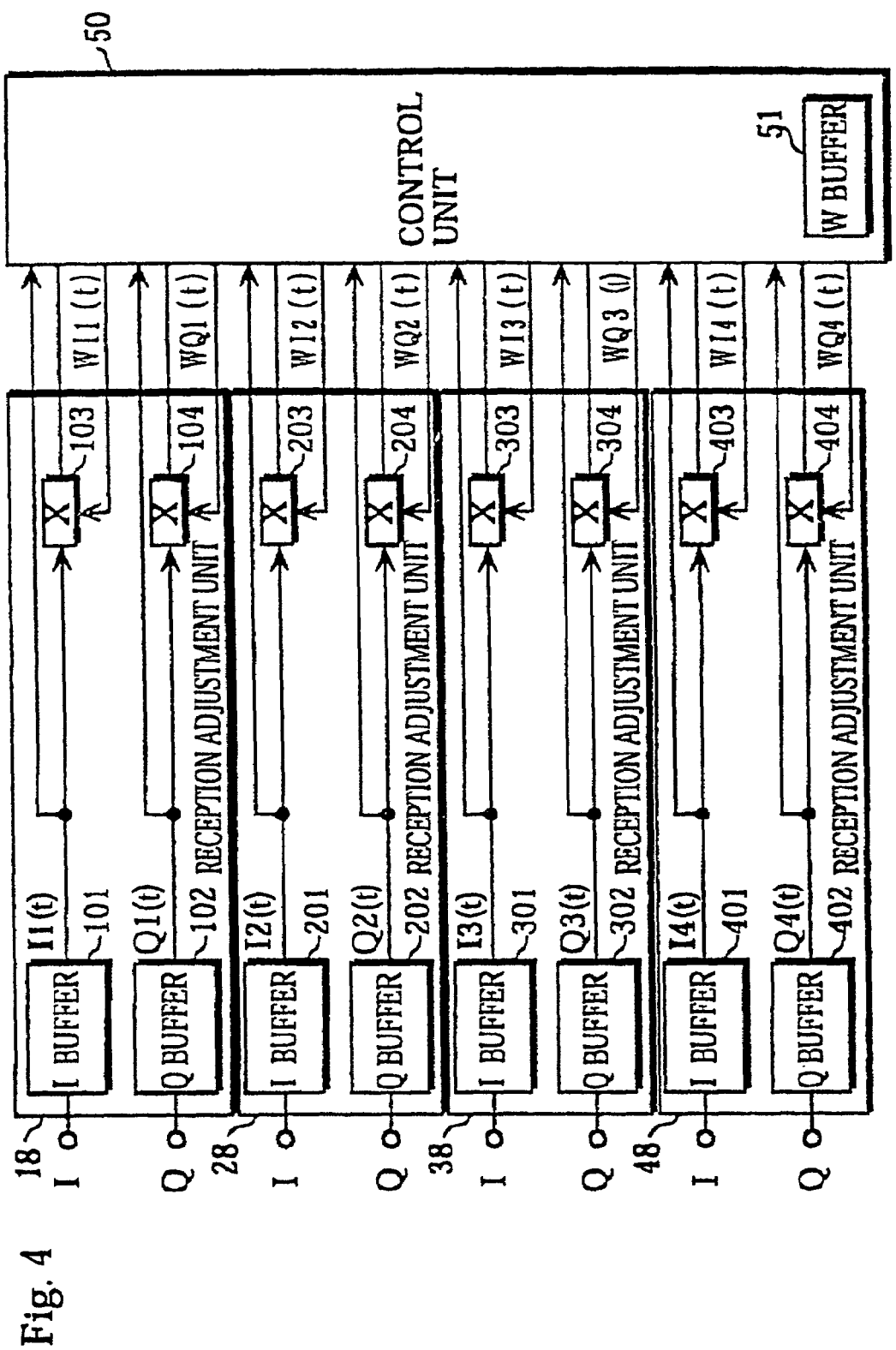
FIG. 4 is a block diagram showing the detailed constructions of the reception adjustment units and the control unit of the adaptive array apparatus.

FIG. 4 is a block diagram showing the detailed constructions of the reception adjustment units and the control unit of the adaptive array apparatus shown in FIG. 1.

The reception adjustment units 18, 28, 38, and 48 all have the same construction and the following description takes the reception adjustment unit 18 as an example.

The reception adjustment unit 18 includes an I buffer 101, a Q buffer 102, and multipliers 103 and 104.

The I buffer 101 sequentially renews and holds I components of the latest four symbols that are input from the demodulator 16. The I components of the latest four symbols are expressed by $I1(t-3*\Delta t)$, $I1(t-2*\Delta t)$, $I1(t-\Delta t)$, and $I1(t)$. Here, "1" of I1 corresponds to the radio communication unit 10, "t" represents a symbol time, and $\Delta t$ represents a symbol period. The I buffer 101 outputs the I component $I1(t)$ and the control unit 50 can randomly read the I component from the I buffer 101. Note that it is enough for the I buffer 101 to store pieces of data whose number is obtained by adding one to the number of symbols for which interpolation processing (indirect calculation processing) is performed. In this embodiment, the number of pieces of data held by the I buffer 101 is set to four.

The Q buffer 102 holds Q components of the latest four symbols that are input from the demodulator 16, as the I buffer 101. The Q components of the latest four symbols are expressed by $Q1(t-3*\Delta t)$, $Q1(t-2*\Delta t)$, $Q1(t-\Delta t)$, and $Q1(t)$.

The multiplier 103 assigns a weight to an I component. That is, the multiplier 103 multiplies an I component input from the demodulator 16 by the corresponding weighting factor given by the control unit 50.

The multiplier 104 assigns a weight to a Q component. That is, the multiplier 104 multiplies a Q component input from the demodulator 16 by the corresponding weighting factor given by the control unit 50.

The reception adjustment units 28, 38, and 48 perform the same operation as the reception adjustment unit 18.

The control unit 50 includes a W buffer 51 and cyclically allocates symbol periods to each user. In each symbol period allocated to one user, for the user, the control unit 50 performs the direct calculation processing to calculate weighting factors corresponding to the symbol received in the allocated symbol period and performs the indirect calculation processing to calculate weighting factors corresponding to symbols received in the remaining three symbol periods. The W buffer 51 stores weighting factors of one symbol that have been previously calculated by the direct calculation processing, for each component dealt with in each radio communication unit. The weighting factors stored in the W buffer 51 are used for the indirect calculation processing.

Specific timings of calculation processing of the control unit 50 are described below.

<Timing of Calculation Processing of Control Unit 50>

Figure 5:
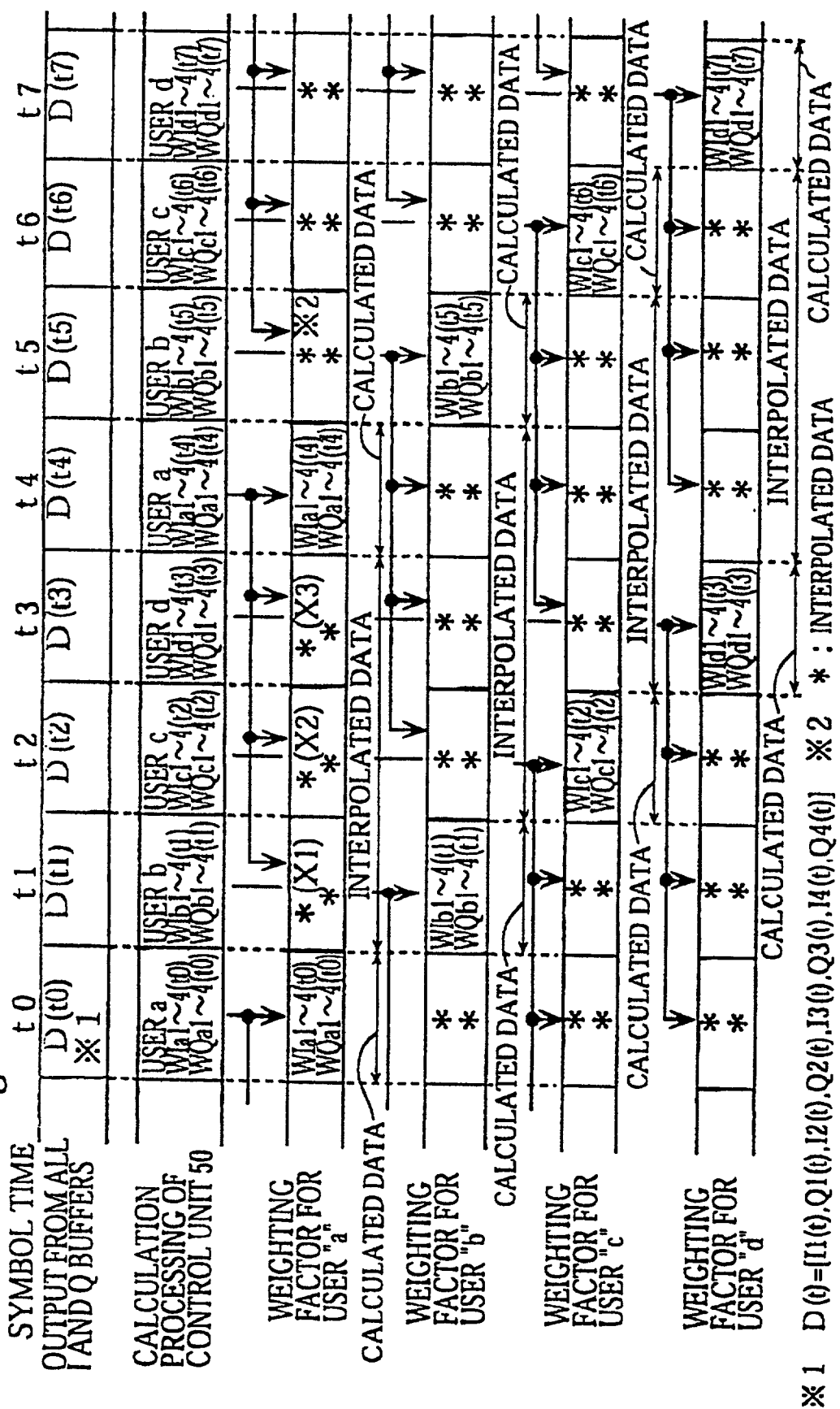
FIG. 5 is the timing chart of the calculation processing of the control unit 50.

FIG. 5 is the timing chart of the calculation processing of the control unit 50. This drawing is based on the assumption that the adaptive array apparatus is shared by four users according to the PDMA communication method.

The "symbol time" row in this drawing gives symbol times t0, t1, t2, . . . One symbol period is set to about five microseconds when the adaptive array apparatus of the present embodiment is used as a base station of the PHS (personal handyphone system).

The "output from all I and Q buffers" row in this drawing gives the output data D(t) outputted from all I and Q buffers in each symbol time. The output data D(t0) outputted at the symbol time t0 is expressed by $$D(t0)=(I1(t0),I2(t0),I3(t0),I4(t0),Q1(t0),Q2(t0),Q3(t0),Q4(t0)).$$

The "calculation processing of control unit 50" row shows which user is allocated the corresponding symbol period and shows the weighting factors calculated by the direct calculation processing. In this example, each symbol period is cyclically allocated to users in the pattern of a, b, c, d, a, b, c, d, . . . For instance, the symbol period at the symbol time t4 is allocated to the user "a". In this symbol period, the weighting factors corresponding to I and Q components dealt with in all radio communication units are calculated to form the directivity pattern of the user "a". More specifically, in this symbol period, the control unit 50 calculates weighting factors corresponding to four symbols received at the symbol times t1–t4 by the direct and indirect calculation processing. To calculate weighting factors, the direct calculation processing is performed for the symbol time t4 and the indirect calculation processing is performed for the symbol times t1–t3.

The "weighting factor for user 'a'" row gives the weighting factors corresponding to each symbol that are calculated to form a directivity pattern for the user "a". For instance, weighting factors corresponding to the symbol times t1–t4 are calculated in the symbol period at the symbol time t4. In this drawing, the weighting factors, $WIa1(t)$ to $WIa4(t)$ and $WQa1(t)$ to $WQa4(t)$, are calculated by the direct calculation processing and the weighting factors, $X3(=XIa1(t)$ to $XIa4(t)$ and $XQa1(t)$ to $XQa4(t))$, are calculated by the indirect calculation processing.

The "weighting factor for user 'b'" row gives the weighting factors corresponding to each symbol that are calculated to form a directivity pattern for the user "b". For instance, weighting factors corresponding to the symbol times t2–t5 are calculated in the symbol period t5.

The "weighting factor for user 'c'" and "weighting factor for user 'd'" rows are the same as the "weighting factor for user 'a'" and "weighting factor for user 'b'" rows.

<Flow of Overall Processing of Control Unit 50>

Figure 6:
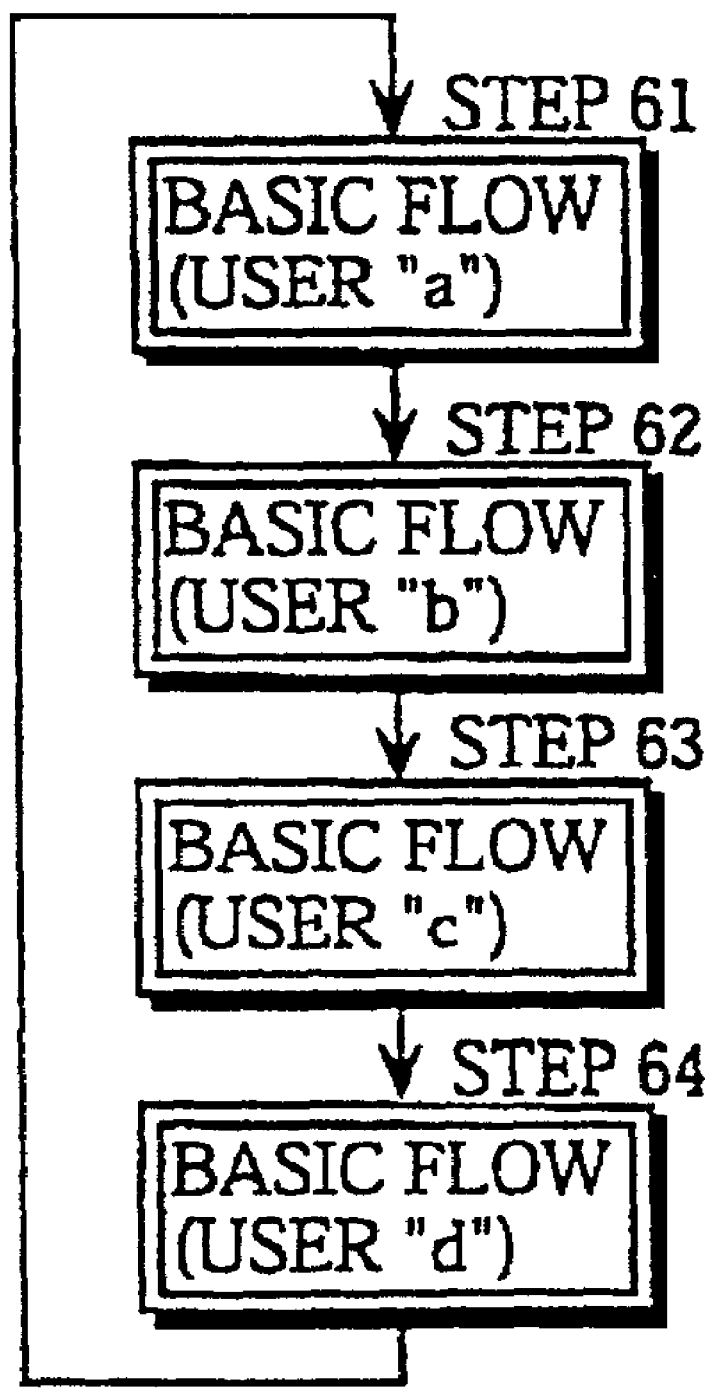
FIG. 6 is a flowchart showing the simplified processing of the control unit 50 to realize the timings of the calculation processing shown in FIG. 5.

FIG. 6 is a simplified flowchart showing the processing of the control unit 50 to realize the timings of the calculation processing shown in FIG. 5. This drawing is also based on the assumption that the adaptive array apparatus of the present embodiment is shared by four users according to the PDMA communication method.

The basic flow in each step in this flowchart shows signal processing performed by the control unit 50 in one symbol period. In each step, the control unit 50 calculates weighting factors corresponding to four symbols by the direct and indirect calculation processing to form a directivity pattern for one user. The control unit 50 performs the processing of the basic flow by cyclically changing the user for which weighting factors are calculated (steps 61–64). The basic flow is described in detail below.

<Signal Processing of Control Unit 50 in One Symbol Period (Basic Flow)>

Figure 7:
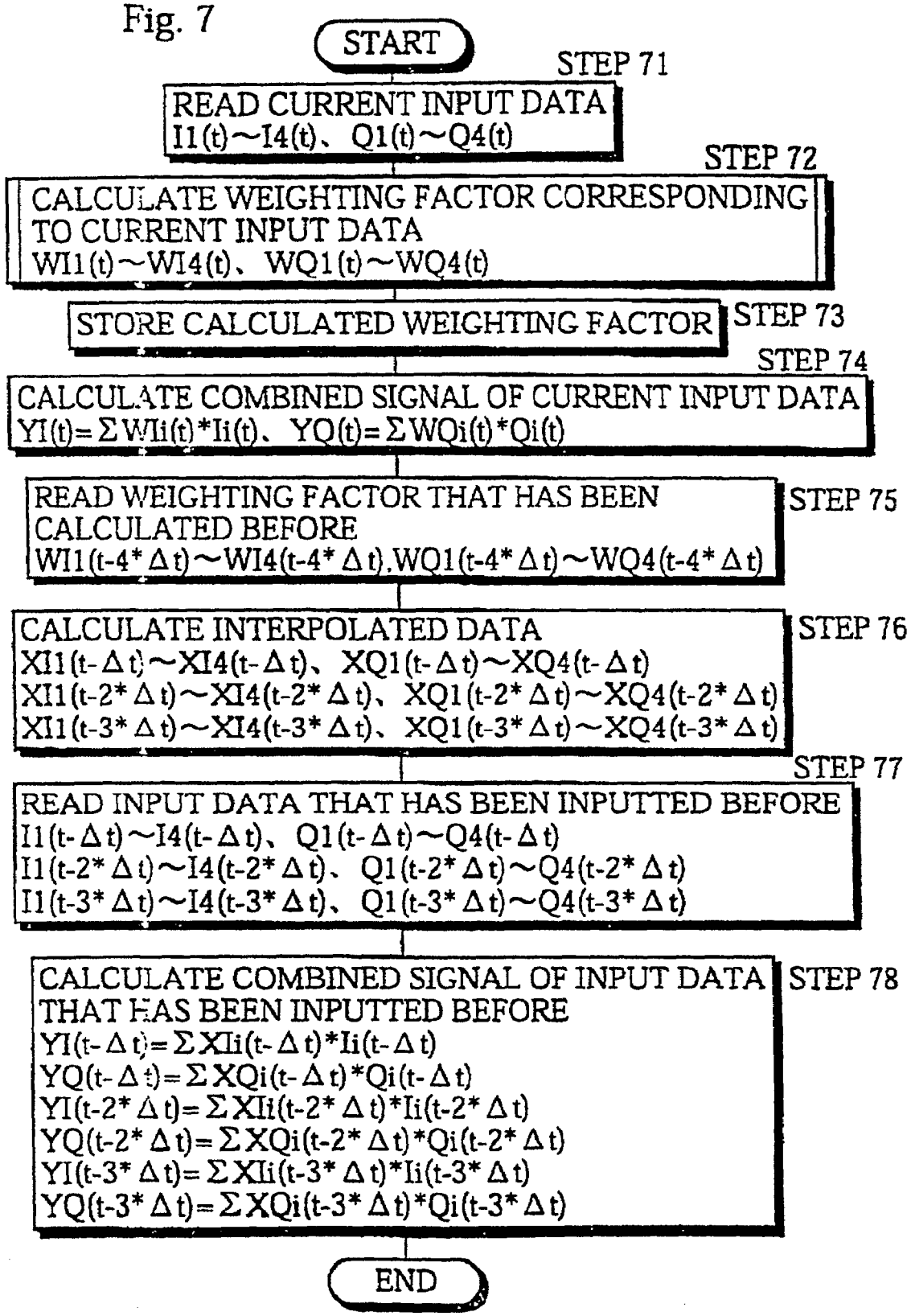
FIG. 7 is a detailed flowchart of the basic flow shown in FIG. 6.

FIG. 7 is a detailed flowchart of the basic flow shown in FIG. 6. The following description concerns the case of the user "a".

As shown in this drawing, the control unit 50 reads I and Q components obtained at the current symbol time "t" ($I1(t)$–$I4(t)$, $Q1(t)$–$Q4(t)$) from I and Q buffers of all radio communication units (step 71). Then the control unit 50 calculates weighting factors corresponding to the current symbol from the read I and Q components by the direct calculation processing (step 72), and stores the calculation results (WIa1($t$) to WIa4($t$) and WQa1($t$) to WQa4($t$)) into the W buffer 51 (step 73). The control unit 50 has all multipliers calculate combined signals for the user "a" at the current symbol time "t" using the calculated weighting factors (step 74). The combined signals, YIa(t) and YQa(t), for the user "a" at the symbol time "t" are obtained by $YIa(t)=\Sigma EWIai(t)*Ii(t), YQa(t)=\Sigma EWQai(t)*Qi(t)$ where i=1-4. The combined signals represent a symbol received at the symbol time "t" using the directivity pattern of the user "a". That is, the combined signals represent the received symbol where received signals of other users are removed.

Then the control unit 50 reads weighting factors that have been previously calculated by the direct calculation processing from the W buffer 51 (step 75). In the case of the timing chart shown in FIG. 5, because the W buffer 51 stores weighting factors that have been calculated four symbol times before, the control unit 50 reads WIa1($t-4*\Delta t$) to WIa4($t-4*\Delta t$) and WQa1($t-4*\Delta t$) to WQa4($t-4*\Delta t$) from the W buffer 51. The control unit 50 calculates weighting factors corresponding to three symbols at the symbol times (t−Δt), (t−2*Δt), and (t−3*Δt) by performing the indirect calculation processing, which is to say interpolation, using the weighting factors read from the W buffer and the weighting factors that have been calculated by the direct calculation processing at the current symbol time "t" (step 76).

Figure 8:
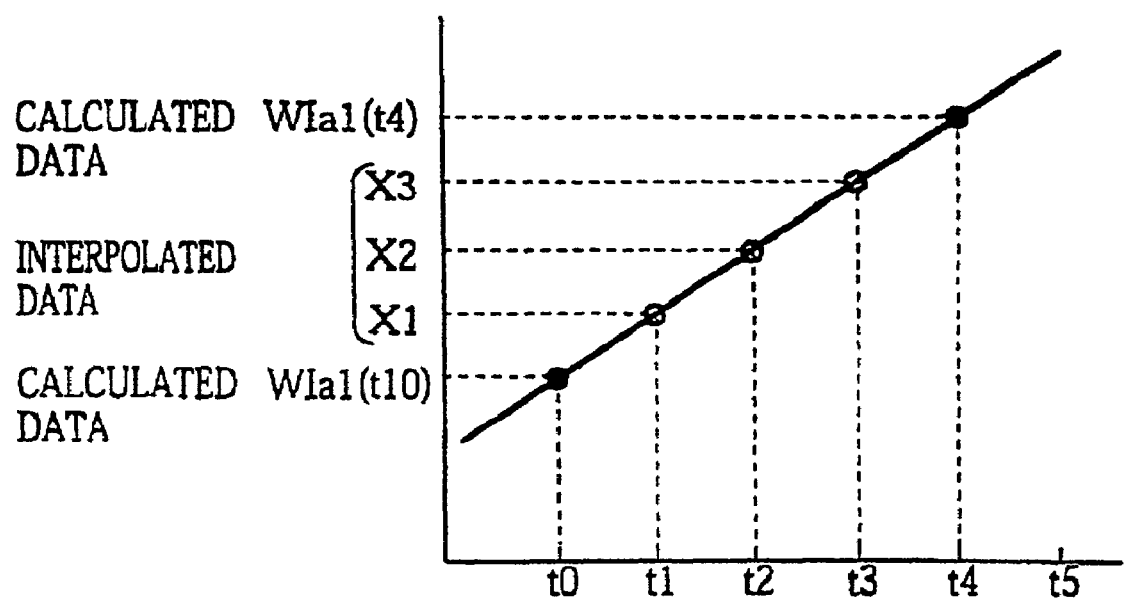
FIG. 8 shows an example where linear interpolation is performed.

FIG. 8 shows the example where linear interpolation is performed. Among indirect calculation processing performed at the symbol time t4, this drawing shows a state where the weighting factors XIa1($t1$), XIa1($t2$), and XIa1($t3$) corresponding to symbols at the symbol times t1, t2, and t3 are calculated using the weighting factors WIa1($t4$) and WIa1($t0$) that correspond to the I components received by the radio communication unit 10.

The weighting factors XQ1($t1$), XQ1($t2$), and XQ1($t3$) that correspond to the Q components received by the radio communication unit 10 are calculated by the same interpolation. The weighting factors corresponding to the I and Q components received by the radio communication units 20, 30, and 40 are also interpolated in the same way.

The control unit 50 further reads symbols obtained before the current symbol time, which is to say I and Q components that correspond to three symbols at symbol times (t−Δt), (t−2*Δt), and (t−3*Δt), from I and Q buffers of all radio communication units (step 77). Then the control unit 50 calculates combined signals given below from the read I and Q components and the weighting factors obtained by performing the indirect calculation processing (step 78). Note that in the following equations, i=1-4.

The combined signals one symbol time before are $YIa(t-\Delta t)=\Sigma XIi(t-\Delta t)*Ii(t-\Delta t)$, and $YQa(t-\Delta t)=\Sigma XQi(t-\Delta t)*Qi(t-\Delta t)$ (step 78).

The combined signals two symbol times before are $YIa(t-2*\Delta t)=\Sigma XIi(t-2*\Delta t)*Ii(t-2*\Delta t)$, and $YQa(t-2*\Delta t)=\Sigma XQi(t-2*\Delta t)*Qi(t-2*\Delta t)$ (step 78).

The combined signals three symbol times before are $YIa(t-3*\Delta t)=\Sigma XIi(t-3*\Delta t)*Ii(t-3*\Delta t)$, and $YQa(t-3*\Delta t)=\Sigma XQi(t-3*\Delta t)*Qi(t-3*\Delta t)$ (step 78).

In this manner, the control unit 50 performs the processing in the basic flow for the user all during the symbol period at the symbol time "t". The processing in the basic flow is also performed for the users "b", "c", and "d" during the symbol periods at the symbol times (t+1), (t+2), and (t+3), respectively.

It should be noted here that although the control unit 50 performs linear interpolation in step 76, any other interpolation method may be performed in step 76.

In step 76, for instance, the control unit 50 may interpolate weighting factors by adding the weighting factors read from the W buffer 51, which is to say WIa1($t-4*\Delta t$) to WIa4 (t−4*Δt) and WQa1 (t−4*Δt) to WQa4 (t−4*Δt), to the weighting factors corresponding to the current symbol, which is to say WIa1($t$) to WIa4($t$) and WQa1($t$) to WQa4($t$), dividing the addition result by two to obtain mean values, and using the mean values as the weighting factors corresponding to three symbols at the symbol times (t−Δt), (t−2*Δt), and (t−3*Δt).

Also, the control unit 50 may interpolate weighting factors by using the weighting factors corresponding to the current symbol, which is to say WIa1($t$) to WIa4($t$) and WQa1($t$) to WQa4($t$), as the weighting factors corresponding to three symbols at the symbol times (t−Δt), (t−2*Δt), and (t−3*Δt). In this case, the control unit 50 does not need to read the weighting factors that have been previously calculated from the W buffer 51 in step 75. As a result, the process in this step can be omitted.

Furthermore, the control unit 50 may interpolate weighting factors by using the weighting factors corresponding to the current symbol, which is to say WIa1($t$) to WIa4($t$) and WQa1($t$) to WQa4($t$), as the weighting factors corresponding to three symbol times following the current symbol time. In this cases the I and Q buffers do not need to store symbols corresponding to the symbol times (t−Δt), (t−2*Δt), and (t−3*Δt).

<Detailed Flow of Direct Calculation Processing>

Figure 9:
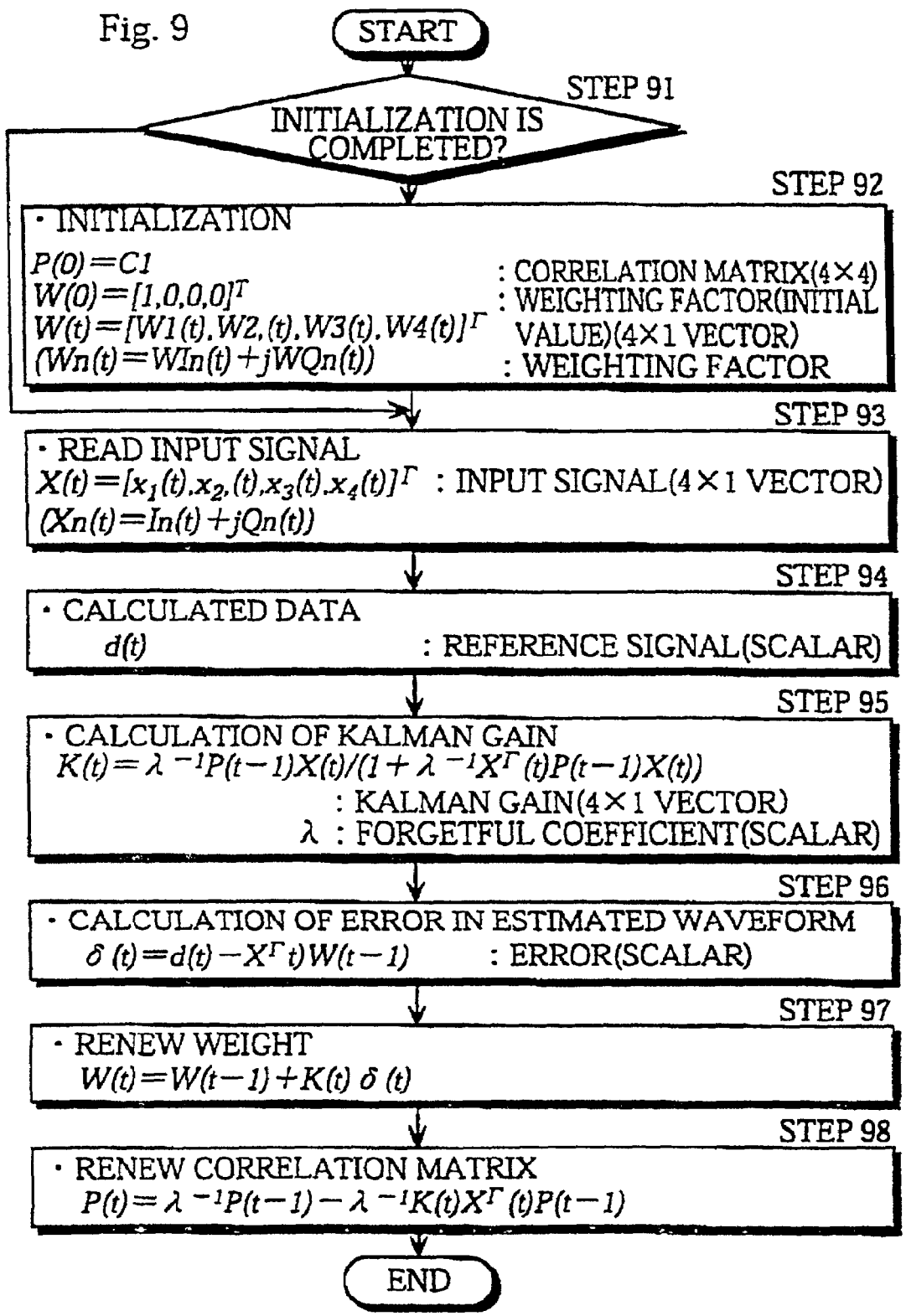
FIG. 9 is a flowchart showing the detailed process for calculating weighting factors at a current symbol time (the direct calculation processing) in step 72 in FIG. 7.

FIG. 9 is a flowchart showing the detailed process for calculating weighting factors corresponding to the current symbol time (the direct calculation processing) in step 72 in FIG. 7.

The processing in this drawing uses a publicly known technique that concerns an adaptive array method using a Kalman filter. This technique is described in detail in Analysis of *Adaptive Antenna Using Kalman Filter* (in "Transactions of the Institute of Electronics and Communication Engineers of Japan", B-II, Vol. J75-B-II No. 11, pp 835–843, November 1992). Therefore, this technique is briefly described below.

The control unit 50 performs initialization when the initialization has not been performed (steps 91 and 92). During the initialization, the initial value P(0) of the estimation error dispersion matrix of a Kalman filter and the initial value W(0) of the weighting factor matrix are set. In this embodiment, the initial value P(0) is C*I (C is a constant and I is a unit matrix of 4×4) and the initial value W(0) is 4×1 vector shown in this drawing. In this case, the weighting factor matrix W(t) is expressed as the 4×1 vector shown in this drawing.

The control unit 50 then sets I and Q components corresponding to the symbol time "t" input from the I and Q buffers as input signals (step 93) and sets the reference signal d(t) (step 94). Here, the reference signal d(t) is the estimated waveform of received signals that should be obtained from a specific user. When signals received at the symbol time "t" is known data, such as the preamble or the user ID of received data, the control unit 50 sets the waveform of the received signals as the estimated waveform. On the other hand, when the signals received at the symbol time "t" is not known data, the control unit 50 temporarily determines the received data and sets the waveform of the received data as the estimated waveform. Here, the received signal Y(t) that is temporarily determined by the control unit 50 is obtained by multiplying I and Q components corresponding to the symbol time "t" by previously calculated weighting factors and by combining the multiplied I and Q components.

The control unit 50 then calculates Kalman gains and the error of the estimated waveform and renews weighting factors and correlation matrixes (steps 95–98), as shown in this drawing. The process in steps 95–98 is performed with a publicly known technique where a recursive least square (RLS) method (RLS algorithm) is applied to a Kalman filter and so is not described here.

In this manner, weighting factors are calculated by the direct calculation processing.

As described above, the adaptive array apparatus of the present embodiment cyclically allocates symbol periods to a plurality of users in the case of the PDMA communication method. In one symbol period, the adaptive array apparatus performs the direct calculation processing to calculate weighting factors of the symbol corresponding to one of the predetermined symbol periods and performs the indirect calculation processing to calculate weighting factors corresponding to the other symbol periods. As a result, the amount of signal processing for calculating weighting factors are considerably reduced, with the weighting factors corresponding to each symbol being renewed for all users.

Embodiment 2

The simplified construction of the adaptive array apparatus of the present embodiment is almost the same as that of the adaptive array apparatus of Embodiment 1 shown in FIG. 1. Therefore, the following description centers on the different aspect between these adaptive array apparatuses.

The different aspect is the way to cyclically allocate symbol periods to a plurality of users. The adaptive array apparatus of the present embodiment is constructed to cyclically allocate units of two symbol periods to a plurality of users.

To do so, I and Q buffers in Embodiment 2 are different from those in Embodiment 1, and sequentially renews and holds data that is input from the demodulator at the latest eight symbol times.

Also, the control unit 50 of Embodiment 2 is different from that of Embodiment 1 and, in successive two symbol periods, performs the direct calculation processing for one symbol and performs the indirect calculation processing for remaining seven symbols.

Figure 10:
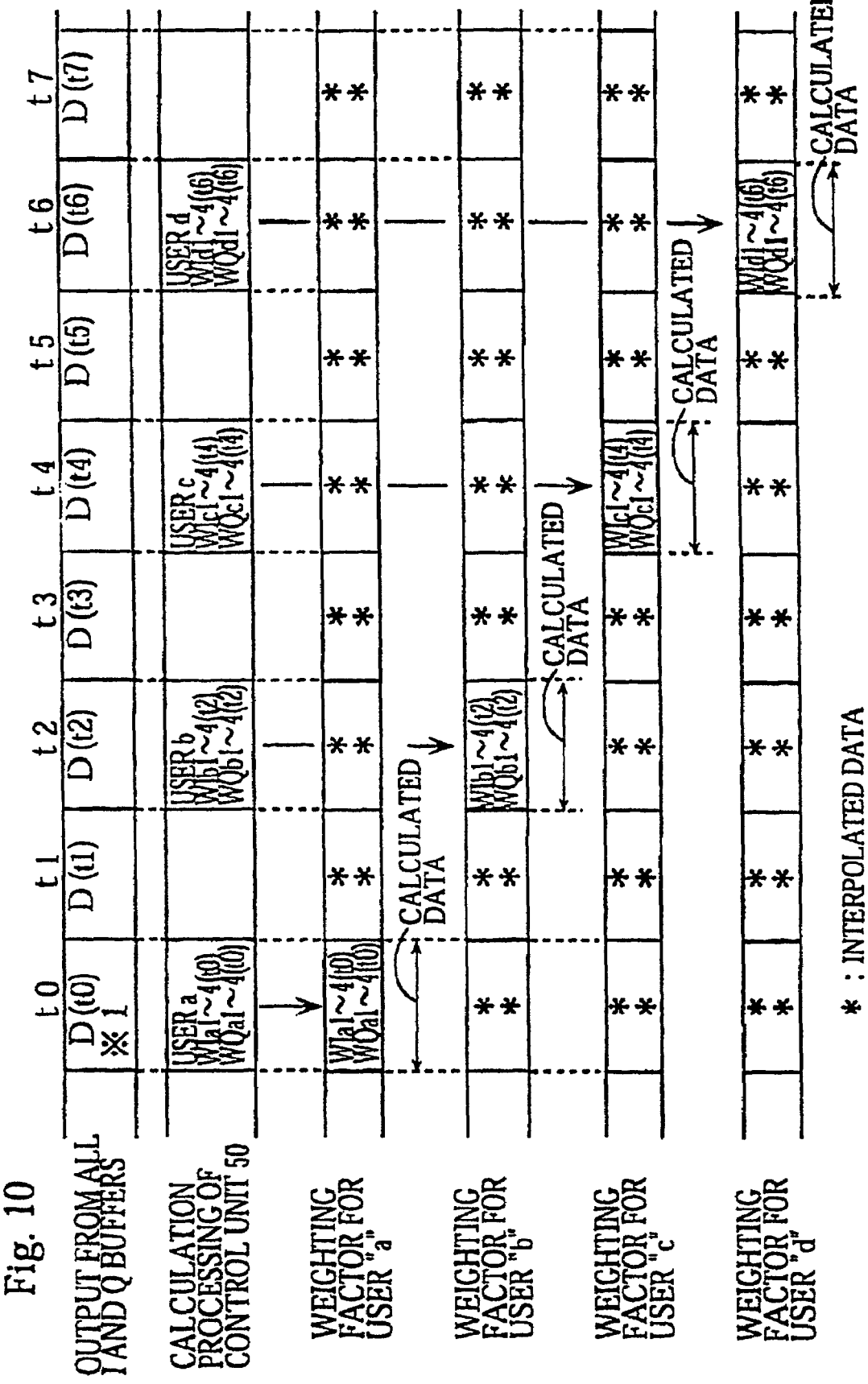
FIG. 10 is a timing chart showing the timings of the calculation processing of the control unit 50 of Embodiment 2.

FIG. 10 is a timing chart showing the timings of the calculation processing of the control unit 50. In this drawing, every unit of two symbol periods is allocated to one user, different from the timing chart shown in FIG. 5. For instance, symbol periods at the symbol times t0 and t1 are allocated to the user "a", symbol periods at the symbol times t2 and t3 are allocated to the user "b". Similarly, a unit of symbol periods at two symbol times is allocated to each of the users "c" and "d".

In two symbol periods, the control unit 50 performs the direct calculation processing to calculate weighting factors corresponding to one out of eight symbols and performs the indirect calculation processing to calculate weighting factors corresponding to the remaining seven symbols. Although the ratio of symbols for which the indirect calculation processing is performed rises, the period in which signals are processed for one user doubles in comparison with Embodiment 1. Consequently, even if a DSP of the control unit 50 has a poor throughput, the control unit 50 can calculate weighting factors corresponding to each symbol for a plurality of users by the direct and indirect calculation processing.

Embodiment 3

In this embodiment, the adaptive array apparatus of the present invention is applied to a path diversity. The path diversity means a method where signals which reach at different times (the signal which reaches first is referred to as a direct wave and signals following the direct wave are referred to as delayed waves) are separately received and are combined to generate received signals.

The simplified construction of the adaptive array apparatus of the present embodiment is almost the same as that of the adaptive array apparatus of Embodiment 1 shown in FIG. 1. Therefore, the following description centers on the different aspect between these adaptive array apparatuses. The different aspect is that the adaptive array apparatus of the present embodiment generates directivity patterns for direct waves and delayed waves of one user, instead of for a plurality of users. The delayed waves mean radio waves that are sent from a user, are reflected by buildings, trains, and automobiles, and reach an adaptive array apparatus following the direct wave. Therefore, the directivity patterns for the delayed waves are different from those for the direct waves. As a result, the adaptive array apparatus of the present embodiment is constructed to generate separate directivity patterns for direct waves and delayed waves. To do so, the adaptive array apparatus of the present embodiment willingly selects and receives delayed waves as well as direct waves, and combines the delayed waves with the direct waves.

FIG. 11 is the timing chart of the calculation processing of the control unit 50. This drawing is the same as FIG. 5 except that the directivity patterns are generated for a direct wave and delayed waves 1–3, instead of for the users "a"–"d".

Therefore, different processing is performed to set the reference signal in step 94 in FIG. 9. The control unit 50 sets an estimated waveform as the reference signal d(t) corresponding to the direct wave in the same way as Embodiment 1. The control unit 50 temporarily determines the symbol of a direct wave to obtain a received signal, gives an estimated delay time to the received signal to obtain an estimated waveform, and sets the estimated waveform as the reference signal d(t) corresponding to each delayed wave.

The received signals of the direct wave and the delayed waves 1–3 are combined using the corresponding weighting factors and are used to judge received symbols.

In this manner, the adaptive array apparatus of the present embodiment willingly selects and receives a plurality of delayed waves as well as direct waves and judges final received symbols using a result where the direct and delayed waves are combined. As a result, C/N ratio is improved, which improves the reliability even if the propagation circumstances of radio waves are deteriorated due to fading.

As described above, when signals are processed only by the direct calculation processing, the amount of signal processing is considerably increased. To cope with this problem, in each embodiment, the indirect calculation processing (the interpolation processing) is also performed at an appropriate ratio. As a result, the amount of signal processing is substantially reduced.

The probability of degradation in characteristics caused by the interpolation processing is described below.

When data is calculated by interpolation, there is ordinarily a probability of degradation in characteristics, in comparison with the case where all data is calculated by the direct calculation processing. This is because there are errors between data calculated by the indirect calculation processing and actual data. Therefore, as the number of pieces of data calculated by the indirect calculation processing is increased, the probability of degradation in characteristics increases.

In each embodiment, however, the changes in weighting factors that are calculated by the interpolation processing are sufficiently reduced. Therefore, the influences of the errors and the probability of degradation in characteristics are reduced. That is, the interval between the interpolation processing where characteristics are not degraded is determined by the changing ratio of weighting factors.

The changes in weighting factors are caused by the changes in the propagation circumstances due to the mobility of users, and the changing ratio of weighting factors are proportional to the moving speed of the users. Accordingly, the upper limit to the changing ratio of weighting factors can be found from the upper limit to the moving speed of users. As a result, even if the transfer speed is high, the degradation in characteristics is not caused by setting the intervals between interpolation processing no more than the upper limit to the changing ratio of weighting factors.

Therefore, when the intervals between interpolation processing of the adaptive array apparatus of the present invention is no more than the upper limit to the changing ratio of weighting factors, the adaptive array apparatus of the present invention can be basically used without reference to the transfer speed.

It should be noted here that the adaptive array apparatus of the present invention can be modified as described below. FIG. 12 shows modifications of the adaptive array apparatus of the present invention as well as the adaptive array apparatuses of Embodiments 1–3.

In this drawing, four symbol periods are regarded as one cycle and each symbol period in each cycle is cyclically set as time slots 1–4. In this drawing, Case No. 1 concerns Embodiment 1, and Case No. 2 concerns Embodiment 3.

Case No. 3 concerns the case where the direct waves are obtained in the time slots 1 and 3 and the delayed waves are obtained in the time slots 2 and 4 for one user. In this case, the direct calculation processing is performed in one out of every two symbol periods and the indirect calculation processing is performed in the remaining one symbol period to calculate weighting factors.

Case No. 4 concerns the case where the direct wave is obtained in the time slots 1 and 3 for one user. In this case, the weighting factors corresponding to the time slots 1 and 3 are calculated by the direct calculation processing and the weighting factors corresponding to the time slots 2 and 4 are calculated by the indirect calculation processing.

Case No. 5 concerns the case where the direct wave is obtained in the time slot 1 and the delayed wave is obtained in the time slot 3 for one user. In this case, the weighting factor corresponding to one symbol of the direct wave and the weighting factor corresponding to one symbol of the delayed wave are calculated by the direct calculation processing and the weighting factors corresponding to remaining three symbols are calculated by the indirect calculation processing.

Case No. 6 concerns the case where two users "1" and "2" share an adaptive array apparatus and weighting factors are calculated for the user "1" in the first and third time slots and weighting factors are calculated for the user "2" in the second and fourth time slots. In this case, for each user, weighting factors corresponding to one out of every two symbols are calculated by the direct calculation processing and weighting factors corresponding to the remaining one symbol are calculated by the indirect calculation processing.

Case No. 7 concerns the case where two users "1 " and "2" share an adaptive array apparatus and the weighting factors corresponding to the direct wave of the user "1" is calculated in the first time slot, the weighting factors corresponding to the delayed wave of the user "1" is calculated in the second time slot, the weighting factors corresponding to the direct wave of the user "2" is calculated in the third time slot, and the weighting factors corresponding to the delayed wave of the user "2" is calculated in the fourth time slot. In this case, for each of the direct and delayed waves of each user, weighting factors corresponding to one out of four symbols are calculated by the direct calculation processing and weighting factors corresponding to the remaining three symbols are calculated by the indirect calculation processing.

Weighting factors are also appropriately calculated in Case Nos. 8, 9, and 10 in the manner shown in FIG. 12.

In each embodiment, as shown in FIGS. 5, 10, and 11, the control unit 50 calculates weighting factors corresponding to direct waves or delayed waves for a specific user in allocated symbol periods. However, the calculation of weighting factors does not necessarily synchronize to symbol periods. That is, as each embodiment, the adaptive array apparatus of the present invention may operate in synchronization with receiving times of symbols (I and Q components) in real time. The adaptive array apparatus may also store symbols received in a predetermined number of symbol periods and process the stored symbols by one operation.

INDUSTRIAL USE POSSIBILITY

As described above, the adaptive array apparatus of the present invention is very useful as a base station for mobile communication.

The invention claimed is:

1. An adaptive array apparatus, comprising:
   a plurality of pairs of an antenna and a radio unit, for transmitting and receiving symbols using the radio units in a respective symbol period using combining coefficients, the combining coefficients being calculated for each radio unit and being used for forming a directivity pattern;
   storing means for storing symbols that are received by every radio unit in a plurality of symbol periods, each radio unit receiving a symbol in each symbol period;
   calculation means for calculating combining coefficients corresponding to one symbol period out of the plurality of symbol periods, based on symbols corresponding to the one symbol period out of the stored symbols; and
   interpolation means for interpolating combining coefficients corresponding to several symbol periods that are different from the one symbol period of the plurality of symbol periods, based on the calculated combining coefficients.

2. The adaptive array apparatus of claim 1, wherein
the storing means stores symbols that are received in the latest k symbol periods (k is an integer no less than two),
the calculation means calculates combining coefficients corresponding to a given symbol period out of every group of k symbol periods, there being k-1 symbol periods between the given symbol period and a previous given symbol period for which the calculation means calculated combining coefficients, and
the interpolation means interpolates combining coefficients corresponding to the k-1 symbol periods between the given symbol period and the previous given symbol period, based on the combining coefficients calculated for the given symbol period and the previous given symbol period.

3. The adaptive array apparatus of claim 2, wherein
the interpolation means linearly interpolates the combining coefficients corresponding to the k-1 symbol periods based on the combining coefficients calculated for the given symbol period and the previous given symbol period.

4. The adaptive array apparatus of claim 2, wherein
the interpolation means uses the combining coefficients corresponding to the previous given symbol period as the interpolated combining coefficients.

5. The adaptive array apparatus of claim 2, wherein
the interpolation means uses the combining coefficients corresponding to the given symbol period as the interpolated combining coefficients.

6. The adaptive array apparatus of claim 2, wherein
the calculation means calculates combining coefficients used for forming a directivity pattern for a user radio in the given symbol period and calculates combining coefficients used for forming a directivity pattern for another user radio in a different given symbol period out of every group of k symbol periods, there being k-1 symbol periods between the different given symbol period and a previous different given symbol period for which the calculation means calculates combining coefficients used for forming the directivity pattern for the other user radio, and
the interpolation means interpolates combining coefficients corresponding to the k-1 symbol periods between the given symbol period and the previous given symbol period, based on the combining coefficients calculated in the given symbol period and the previous given symbol period, and interpolates combining coefficients corresponding to the k-1 symbol periods between the different given symbol period and the previous different given symbol period, based on the combining coefficients calculated in the different given symbol period and the previous different given symbol period.

7. The adaptive array apparatus of claim 6, wherein
each symbol is expressed by an inphase component and a quadrature component,
the storing means stores inphase components and quadrature components of the symbols received in the latest k symbol periods,
the calculation means calculates combining coefficients corresponding to inphase components and quadrature components of the symbols corresponding to the given symbol period out of the stored symbols, based on the inphase components and the quadrature components of the corresponding symbols, and
the interpolation means interpolates combining coefficients corresponding to the k-1 symbol periods between the given symbol period and the different given symbol period, based on the combining coefficients calculated in the given symbol period and the different given symbol period.

8. The adaptive array apparatus of claim 2, wherein
the calculation means calculates combining coefficients used for forming a directivity pattern for a direct wave in the given symbol period and calculates combining coefficients used for forming a directivity pattern for an indirect wave in a different given symbol period out of every group of k symbol periods, there being k-1 symbol periods between the different given symbol period and a previous different given symbol period for which the calculation means calculated combining coefficients used for forming the directivity pattern for the indirect wave, and
the interpolation means interpolates the combining coefficients corresponding to the k-1 symbol periods between the given symbol period and the different given symbol period, based on the combining coefficients calculated in the given symbol period and the previous given symbol period, and interpolates combining coefficients corresponding to k-1 symbol periods between the different given symbol period and the previous different given symbol period, based on the combining coefficients calculated in the different given symbol period and the previous different given symbol period.

9. The adaptive array apparatus of claim 1, wherein
the calculation means and the interpolation means include a programmable digital signal processor.

10. An adaptive array apparatus of claim 1, wherein
the storing means stores symbols that are received by each radio unit in the latest k symbol periods, where k is no less than two, each radio unit receiving a symbol in each symbol period;
the calculation means calculates combining coefficients corresponding to a given symbol period out of every group of k symbol periods, based on symbols corresponding to the given symbol period out of to stored symbols, there being k-1 symbol periods between the given symbol period and a previous given symbol period for which the calculation means calculated combining coefficients; and
the interpolation means interpolating combining coefficients corresponding to the k-1 symbol periods between the given symbol period and the previous given symbol period, based on the calculated combining coefficients corresponding to the given symbol period and the previous given symbol period.

11. The adaptive array apparatus of claim 10, wherein
k is no less than a number of symbol periods that equates to the time taken by the calculation means to calculate combining coefficients.

12. An adaptive array apparatus having a plurality of pairs of an antenna and a radio unit, for transmitting and receiving symbols using the radio units in a respective symbol period using combining coefficients, the combining coefficients being calculated for each radio unit and being used for forming a directivity pattern, comprising:
a storage unit that stores symbols that are received by every radio unit in a plurality of symbol periods, each radio unit receiving a symbol in each symbol period, and each symbol being expressed by an inphase component and a quadrature component;
a calculation unit that calculates combining coefficients based on symbols corresponding to one symbol period out of the stored symbols, the combining coefficients corresponding to the one symbol period out of the plurality of symbol periods; and an interpolation unit that interpolates combining coefficients based on the calculated combining coefficients, the combining coefficients corresponding to several symbol periods that are different from the one symbol period out of the plurality of symbol periods.

* * * * *